Patented Oct. 30, 1945

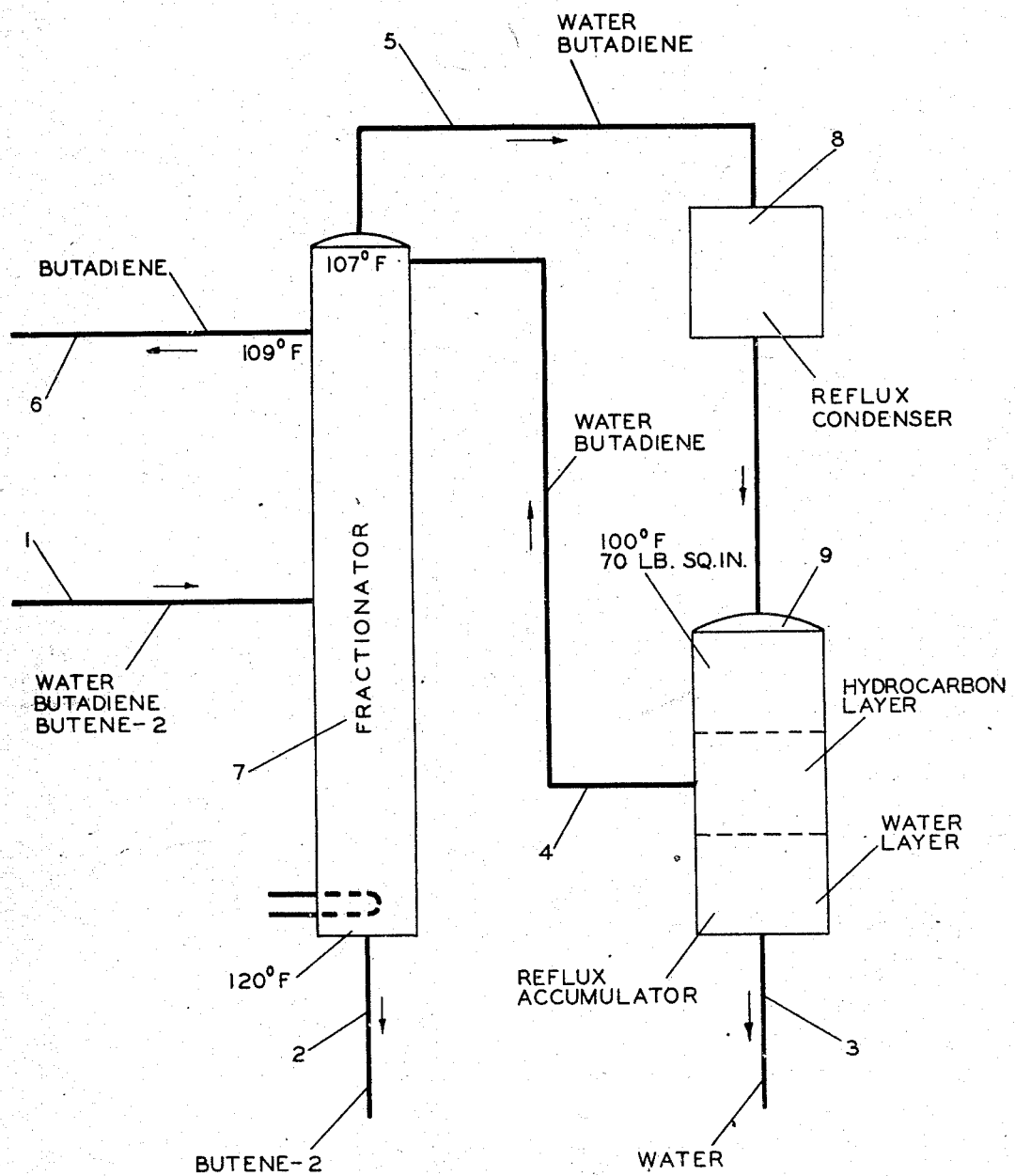

2,387,992

UNITED STATES PATENT OFFICE 2,387,992

MANUFACTURE OF BUTADIENE

Karl H. Hachmuth, Bartlesville, Okla., assignor to Phillips Petroleum Company, a corporation of Delaware Application March 22, 1943, Serial No. 480,085

6 Claims. (Cl. 202—42)

This invention relates to a method of manufacturing butadiene, more particularly to a method of separating water from butadiene, and still more particularly to such a method wherein the separation of the water from the butadiene is accomplished in the same fractionator wherein butadiene is separated from less volatile hydrocarbons, especially butene-2.

In some processes for the recovery and purification of butadiene-1,3 from a complex hydrocarbon mixture, the final step in the purification process involves a fractionation between butadiene and less volatile hydrocarbons, usually butene-2. In addition, some processes for the purification of butadiene are of such nature that the feed charged to the final butadiene fractionator is saturated with water. This water contained in the feed will pass overhead to the reflux accumulator, and, therefore, if butadiene product is withdrawn from the reflux accumulator in the conventional manner, it will be saturated with water. Since it is desirable that butadiene for use in rubber synthesis be essentially water-free, the butadiene product from this fractionator must be further treated for water removal which is both inconvenient and expensive.

An object of my invention is to provide an improved process for the separation of water from butadiene. Another object is to effect this separation while separating butadiene from less volatile hydrocarbons, thus effecting production of high quality butadiene without necessity for resorting to further processing to remove water. Numerous other objects will hereinafter appear.

The accompanying drawing portrays diagrammatically an arrangement of equipment adapted for carrying out the process of the present invention.

In accordance with my invention separation between water and butadiene is effected in the same fractionator that is used for separating butadiene from less volatile hydrocarbons, especially butene-2. The water separation is accomplished by withdrawing liquid butadiene product from the fractionator at a point somewhere between the feed entry and the reflux entry, and by withdrawing the water from a water layer formed in the reflux accumulator. It has been found that the liquid butadiene product so withdrawn is essentially water-free, meeting the specifications with respect to both content of butadiene and freedom from water.

The butadiene content of the butadiene product produced in the above manner is essentially the same as that of butadiene produced in the same fractionator and with the same reflux but with no water in the feed and with butadiene product removed at the reflux accumulator.

The water removed from the reflux accumulator will be saturated with hydrocarbons. Due to the low solubility of hydrocarbon in water and also because the quantity of water is relatively small, the amount of hydrocarbon lost in this manner will be very slight.

The overhead vapors from the fractionating column will consist essentially of water and butadiene. This vaporous overhead is conveniently condensed and the condensate caused to undergo layer separation in the reflux accumulator. The lower water layer will be withdrawn from the reflux accumulator and will contain essentially all of the water contained in the feed together with a small amount of dissolved butadiene and butene-2. The upper butadiene layer is returned in its entirety as reflux to the top tray. This butadiene layer is saturated with water at the temperature of the reflux accumulator.

My invention is made possible by utilizing the vaporization phenomenon exhibited by water when dissolved in $C_4$ hydrocarbon; that is, water has a greater tendency to go from the liquid to the vapor phase than does the hydrocarbon.

For reference purposes, in the following table are listed normal boiling points and vaporization equilibrium constants for the components involved in the specific example given below.

| Component | Normal boiling point, °F | [1] Vaporization equilibrium constant, "K," at 120° F. and 70 lbs. per sq. in. absolute |
|---|---|---|
| Water | 212.0 | 6.29 |
| Butadiene | 23.9 | 1.141 |
| Butene-2 (low boiling) | 33.6 | .963 |
| Butene-2 (high boiling) | 38.5 | .897 |

[1] Equilibrium constant "K" is defined as molal concentration in the vapor phase, divided by molal concentration in the liquid phase. The temperature and pressure shown represent about average conditions in a butadiene fractionator.

While butene-2 has been selected as an example of a hydrocarbon less volatile than butadiene for purposes of illustrating my invention, it is to be understood that my invention is not limited thereto. While butene-2 is most apt to be encountered, other hydrocarbons may be present in the feed stream such as four carbon atom acetlyenes and even hydrocarbons having more than four carbon atoms such as $C_5$ hydrocarbons or heavier.

Referring now to the accompanying drawing, a feed consisting of water, butadiene and butene-2 enters the 120 tray fractionator 7 at tray No. 60 through line 1. The bottoms product, withdrawn via line 2, contains practically all of the butene-2 which was present in the feed and a small amount of butadiene. The overhead vapors leave via line 5 and are condensed in reflux condenser 8. The condensate passes to reflux accumulator 9 where layer separation takes place. The water layer is withdrawn via line 3 and contains practically all of the water which was present in the feed plus very slight amounts of butadiene and butene-2. The butadiene layer is returned as reflux via line 4 to the top tray of column 7. Liquid butadiene product leaves the fractionator 7 at tray No. 115 via line 6 and contains a small amount of butene-2 and only a very small amount of water.

Following is a specific example of the process of my invention compared with the conventional method of preparing butadiene from the same feed with the same fractionator and all operating conditions identical other than the point of butadiene removal.

EXAMPLE

A water-saturated butadiene-butene-2 feed analyzing as follows was taken:

FEED ANALYSIS

| Component | Mol per cent |
|---|---|
| Water | 0.33 |
| Butadiene | 64.99 |
| Butene-2 | 34.68 |

A. *Comparative process with butadiene product taken out at reflux accumulator*

This feed was passed to a 120-tray fractionator of conventional design operated in conventional manner, the bottom temperature being 120° F., the top temperature 107° F., and under a pressure of 70 lbs. absolute. The reflux ratio was 10. The butadiene product was withdrawn at the reflux accumulator in the ordinary way. It was saturated with water at the accumulator temperature and had the following composition.

ANALYSIS OF OVERHEAD PRODUCT

| Component | Mol per cent |
|---|---|
| Water | 0.33 |
| Butadiene | 99.09 |
| Butene-2 | 0.58 |

In addition to the water dissolved in the overhead product, some free water was withdrawn from the accumulator since the quantity of water present in the feed exceeded that required to saturate the overhead product.

B. *Process of the invention with butadiene product removed between feed tray and top tray.*

With all other conditions exactly as in A, operation was changed so that the liquid butadiene product was withdrawn at tray No. 115 of the fractionator, operation being as indicated in the drawing. The various streams had the analysis given in the following table. The numbers correspond to the stream numbers on the drawing.

| Line | Description | Composition, mol per cent | | |
|---|---|---|---|---|
| | | Water | Butadiene | Butene-2 |
| 1 | Feed | 0.33 | 64.99 | 34.68 |
| 2 | Bottoms product | | 1.74 | 98.26 |
| 3 | Accumulator water draw off | 98.24 | 1.76 | Trace |
| 4 | Reflux | 0.33 | 99.05 | 0.62 |
| 5 | Overhead vapor | 0.38 | 99.00 | 0.62 |
| 6 | Butadiene product | 0.01 | 99.21 | 0.78 |

From the foregoing it will be seen that the process of the present invention enables the ready production of butadiene virtually free from water without requiring the use of any material amount of additional equipment and without involving complications in operation. Numerous other advantages of my invention will be at once apparent to those skilled in the art.

While the illustrative and most commonly encountered hydrocarbon less volatile than butadiene which is described above is butene-2 it is to be understood that my invention is not limited thereto. My invention is likewise not limited to the other illustrative features and conditions given herein but is to be taken as limited only as set forth in the appended claims.

In this specification and in certain of the claims the term "butene-2" includes both the low and high boiling isomers, unless otherwise specified. In the claims the term "hydrocarbon" is used to designate one or more hydrocarbons.

I claim:

1. The process of preparing butadiene essentially free from water in the same fractionator wherein butadiene is separated from less volatile hydrocarbons which comprises passing a feed containing butadiene, other less volatile hydrocarbon and water, all of said water being dissolved in said feed, to a fractionator, removing from the fractionator a bottoms product comprising said less volatile hydrocarbon, removing from said fractionator overhead vapors comprising water and butadiene, condensing at least a portion of said overhead vapors, effecting separation of the resulting condensate into an upper butadiene layer and a lower water layer containing essentially all of the water contained in said feed, refluxing the top of said fractionator with said butadiene layer, withdrawing said water layer from the system, and withdrawing liquid butadiene essentially free from water from said fractionator at a point intermediate the points of entry of said feed and said reflux thereto.

2. The process of claim 1 wherein said less volatile hydrocarbon is butene-2.

3. The process of preparing butadiene essentially free from water in the same fractionator wherein butadiene is separated from butene-2 which comprises passing a feed containing butadiene, butene-2 and water, all of said water being dissolved in said feed, to a fractionator, removing from the fractionator a bottoms product comprising said butene-2, removing from said fractionator overhead vapors comprising water and butadiene, condensing all of said overhead vapors, effecting separation of the resulting condensate into an upper butadiene layer and a lower water layer, withdrawing said water layer from the system, refluxing the top of said fractionator with said butadiene layer in its entirety, and withdrawing liquid butadiene essentially free from water from said fractionator at a point intermediate the points of said feed and said reflux thereto.

4. The process of claim 1 wherein all of said overhead vapors are condensed.

5. The process of preparing water-free butadiene in the same fractionator wherein butadiene is separated from butene-2 which comprises passing a hydrocarbon feed composed mainly of butadiene and butene-2 containing water, all of said water being dissolved in said feed, into a fractionator at an intermediate point therein and there fractionally distilling same, withdrawing a bottoms product containing the butene-2 content of said feed, taking overhead a vaporous fraction consisting essentially of water and butadiene and containing all the water contained in said feed, condensing all of said overhead fraction and causing the resulting condensate to separate into two layers namely a lower water layer containing essentially all of the water contained in said feed together with a small amount of dissolved butadiene and butene-2 and an upper layer of butadiene saturated with water at the existing temperature, returning said butadiene layer in its entirety as reflux to the top of said fractionator, withdrawing said water layer from the system, and withdrawing liquid butadiene product essentially free from water from said fractionator at a point between the feed entry and the reflux entry and substantially below the latter.

6. The process of claim 5 wherein said fractionator is a 120-tray column, wherein the feed analyzes approximately 0.33 mol per cent water, 64.99 mol per cent butadiene and 34.68 mol per cent butene-2, wherein the liquid butadiene product essentially free from water is withdrawn at the 115th tray, wherein the feed is to the 60th tray, and wherein said fractionator is operated at a pressure of approximately 70 pounds absolute, with a bottom temperature of approximately 120° F. and a top temperature of approximately 107° F.

KARL H. HACHMUTH.